United States Patent [19]

Carter

[11] 4,003,608
[45] Jan. 18, 1977

[54] CRAWLER DRIVE SYSTEM
[75] Inventor: Robert M. Carter, Cedar Rapids, Iowa
[73] Assignee: FMC Corporation, San Jose, Calif.
[22] Filed: July 2, 1975
[21] Appl. No.: 592,568
[52] U.S. Cl. .................................................. 305/57
[51] Int. Cl.² ......................................... B62D 55/08
[58] Field of Search ................. 305/57, 13; 74/229, 74/243 R, 243 C, 247

[56] References Cited
UNITED STATES PATENTS
2,167,039  7/1939  Ekbom .............................. 305/11
3,472,563  10/1969  Irgens .............................. 305/57 X Primary Examiner—Robert B. Reeves
Assistant Examiner—John P. Shannon
Attorney, Agent, or Firm—J. F. Verhoeven; C. E. Tripp

[57] ABSTRACT

A crawler drive system having an endless track is disclosed in which each track sprocket has a double row of teeth and each track shoe has a double row of lugs. The two lugs on each shoe, which lie in different rows, are spaced in the longitudinal direction a greater distance than adjacent teeth of the sprocket so that only one lug of a shoe is engaged by a sprocket tooth at any instant. The two lugs of successive shoes are spaced longitudinally a lesser distance than the pairs of teeth of the sprocket so that only a single lug of a single shoe is engaged by a sprocket tooth at any time.

8 Claims, 11 Drawing Figures

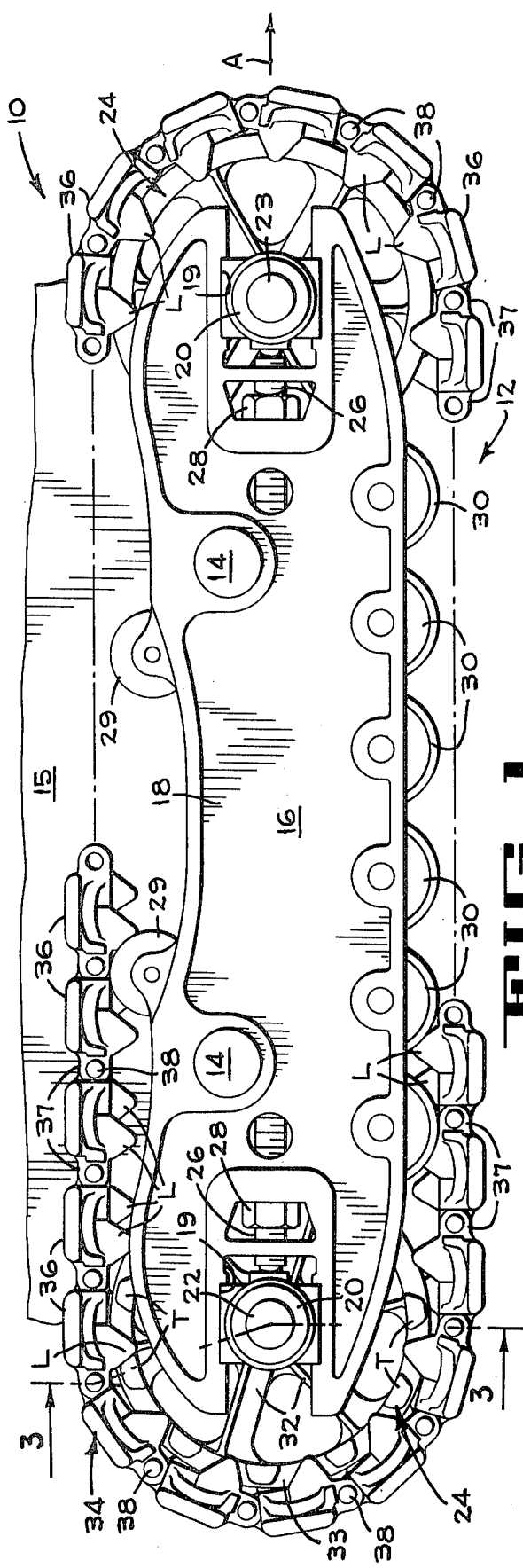
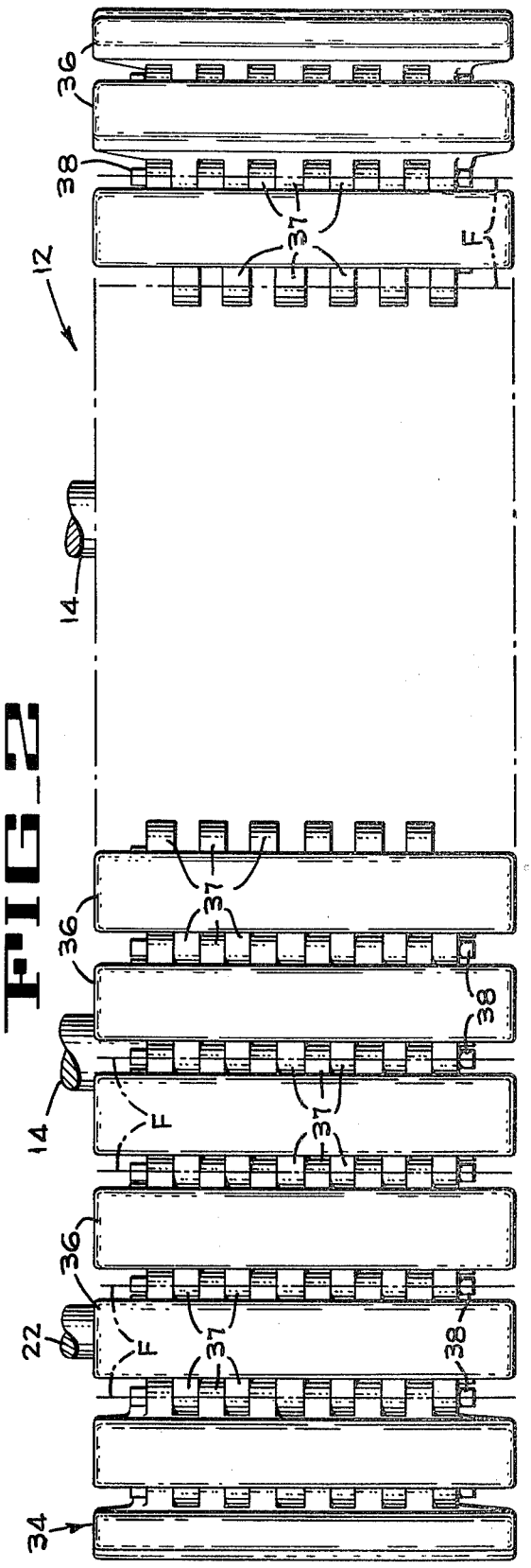
FIG_1
FIG_2

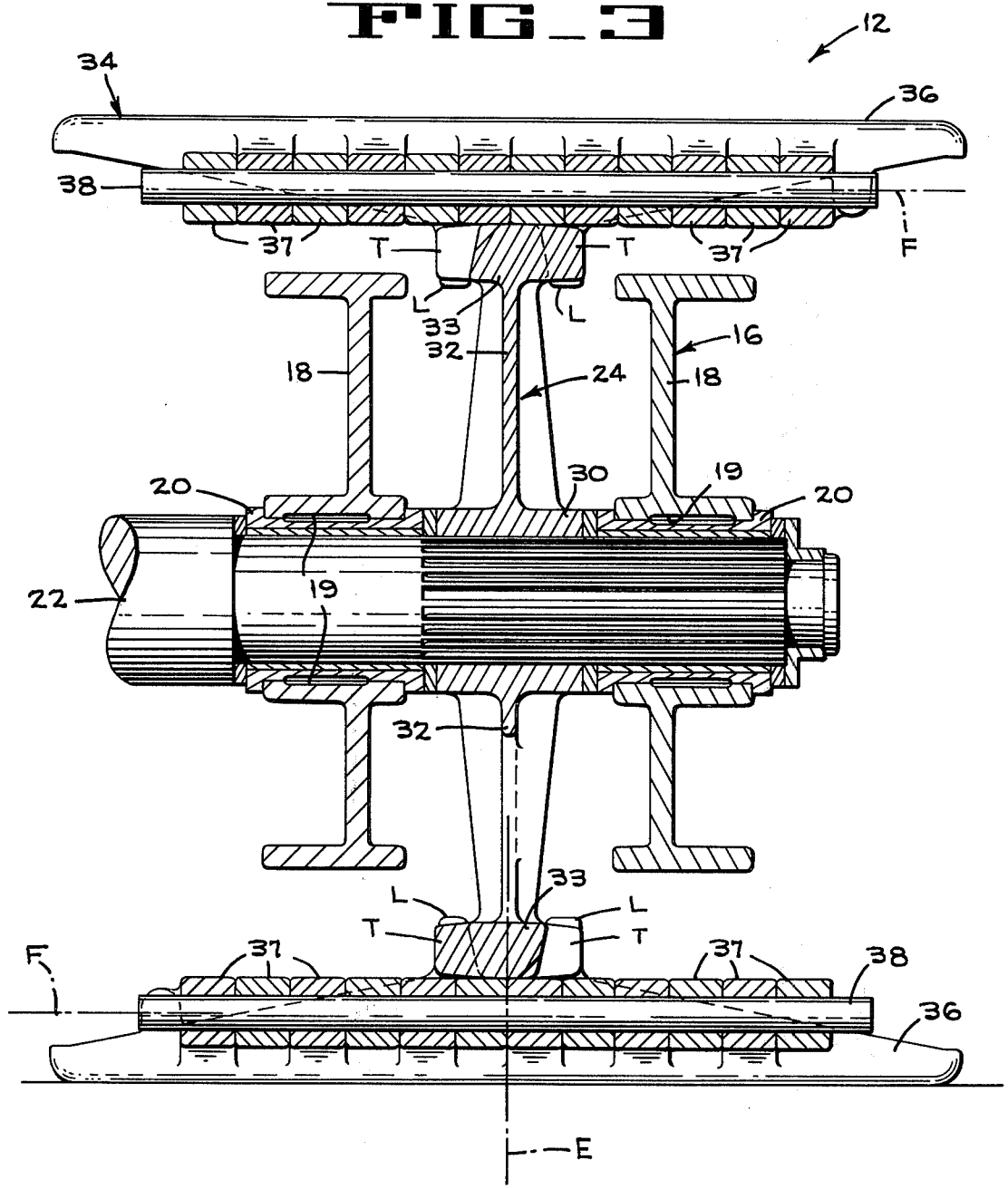

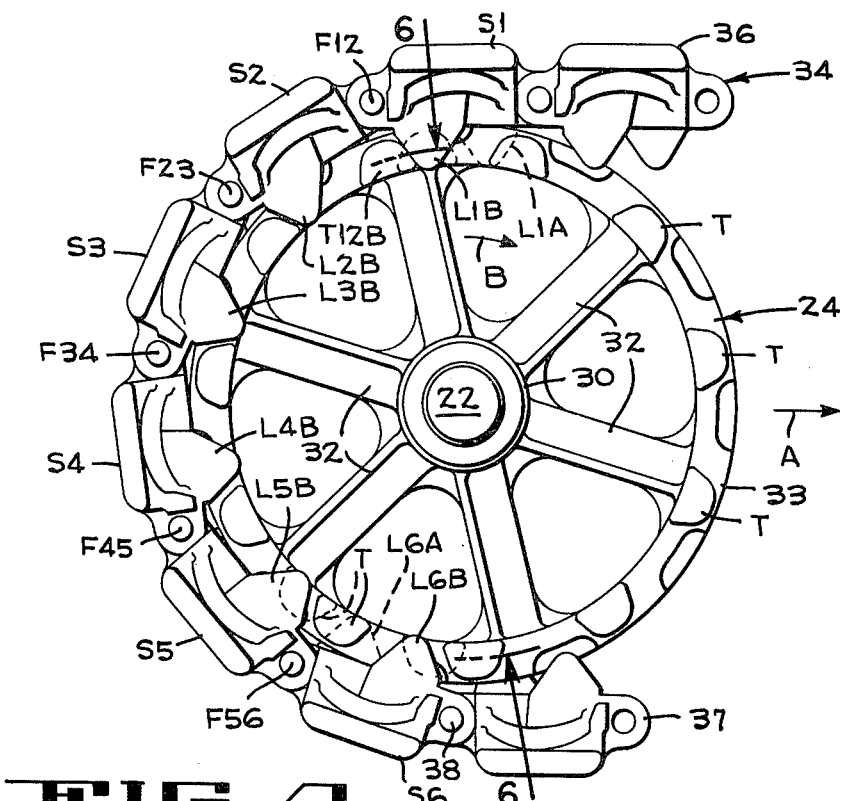
FIG_4
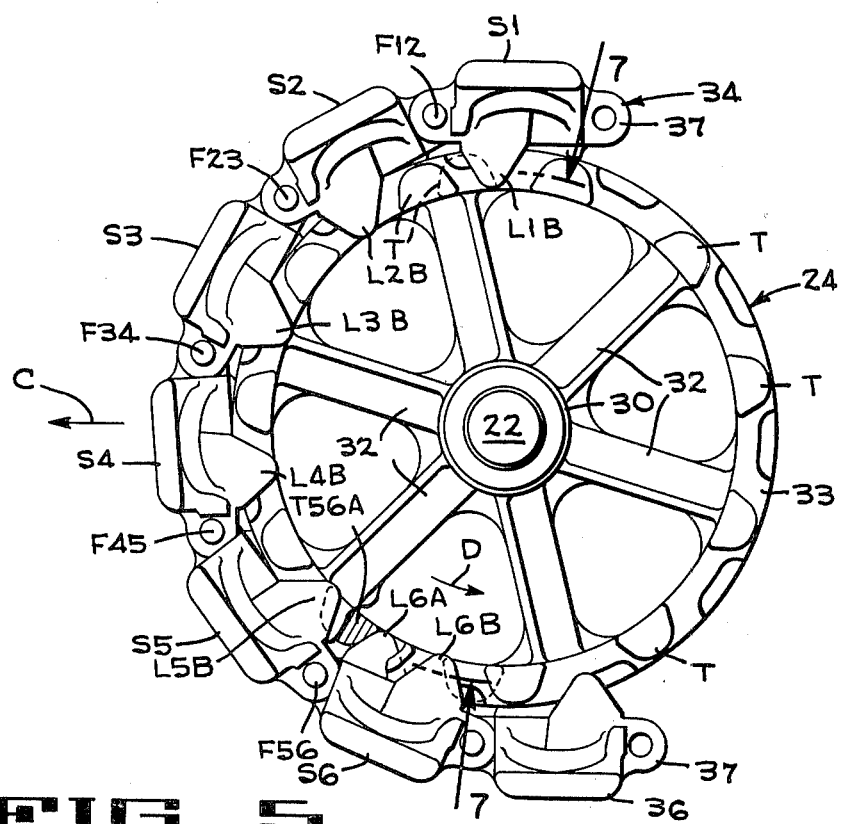
FIG_5

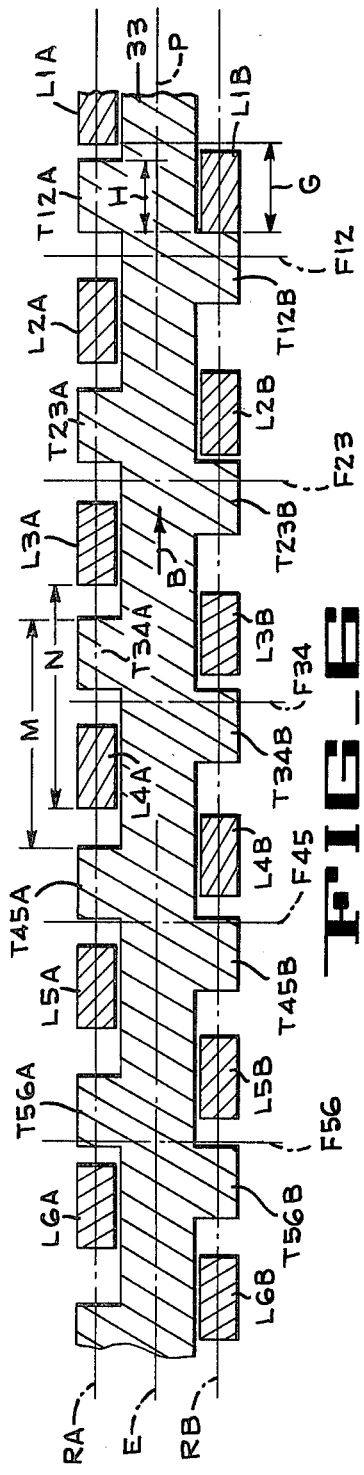
FIG_6
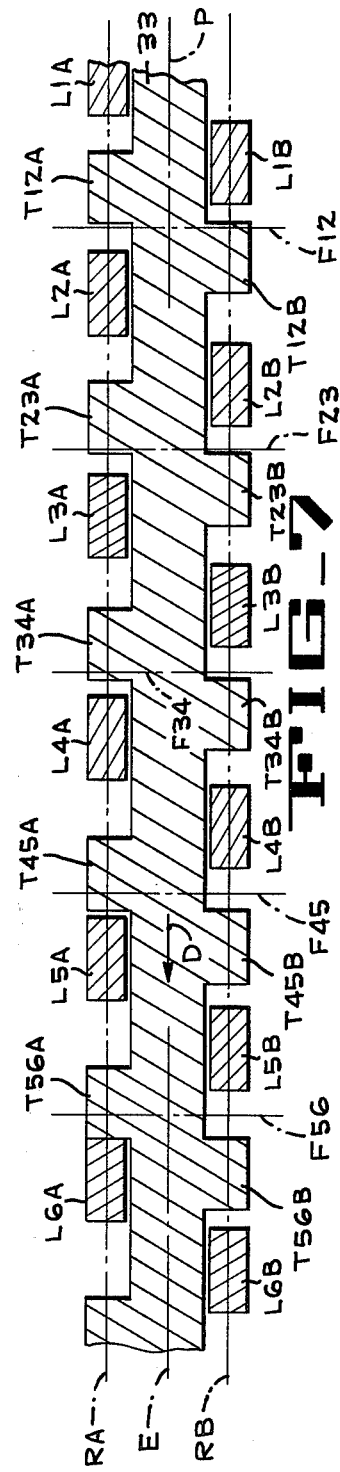
FIG_7
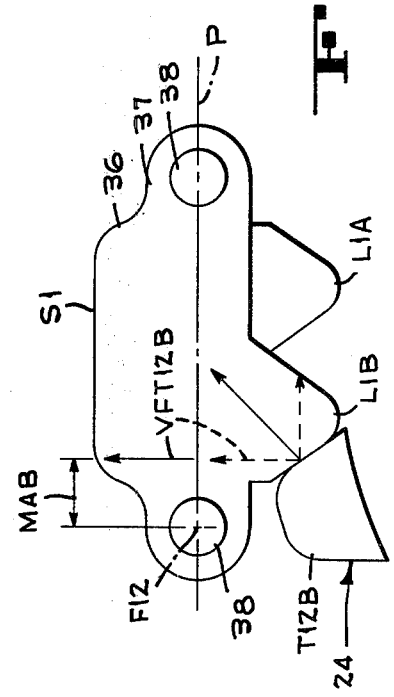
FIG_10

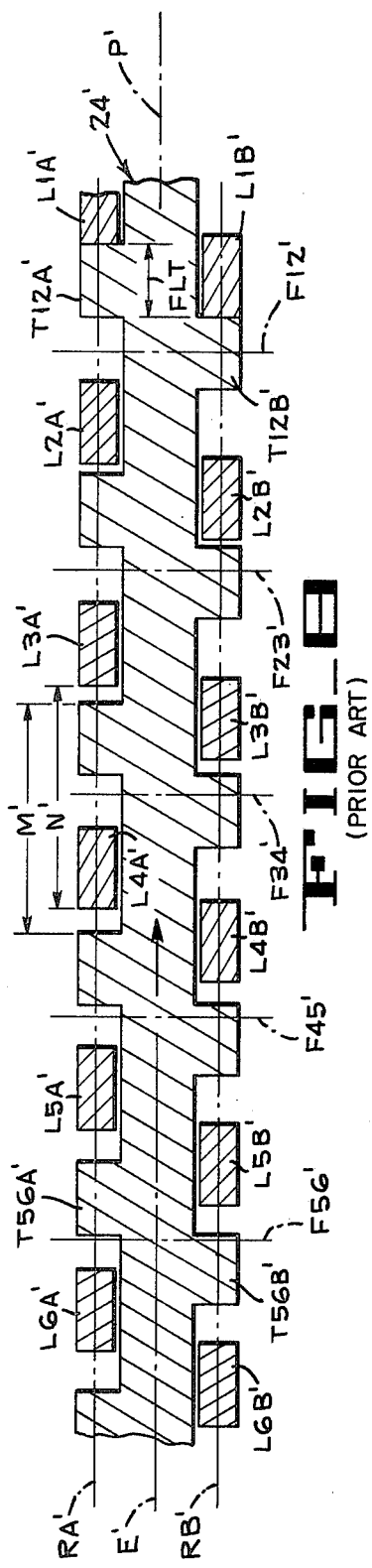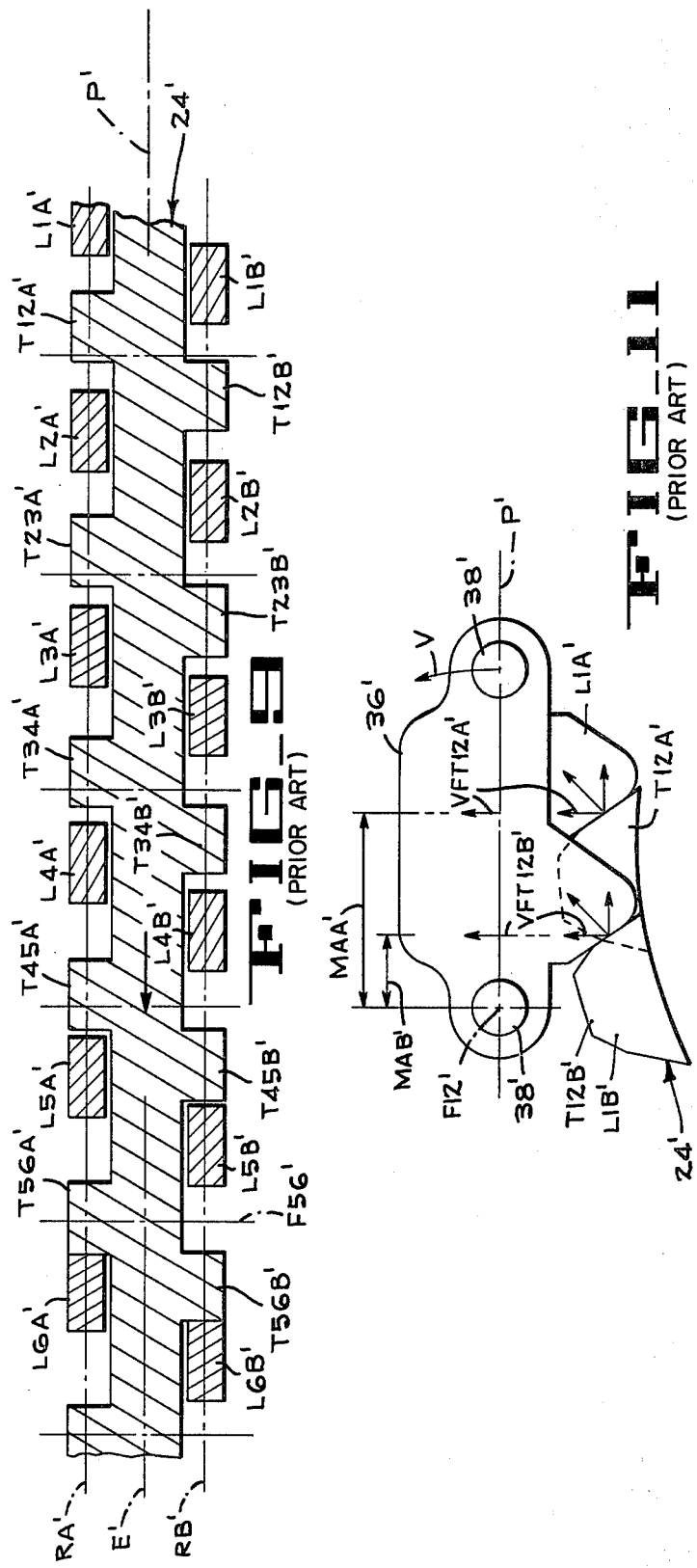

CRAWLER DRIVE SYSTEM

BACKGROUND OF THE INVENTION

The present invention relates to the drive system of a crawler machine, and, more particularly, to the endless track and sprockets thereof.

In a conventional crawler drive system for a crane or other type machine, an endless track is received on spaced sprockets. The track is made of pivotally connected shoes, each of which has inwardly extending lugs. The sprockets (at least one of which is driven) have teeth which engage with the lugs on the shoe to drive the track and propel the machine in a forward or reverse direction.

It is known to have two laterally spaced lugs on each shoe with one lug longitudinally spaced forwardly of the other lug so that the lugs will be spaced apart far enough to minimize the collection of dirt between the lugs of a shoe. With this arrangement, one lug of a shoe is on one side of a vertical central plane extending longitudinally through the shoes, and substantially on either the front half of the shoe or on the rear half of the shoe (where front and rear may be considered with respect to the direction of movement of a shoe on the upper run of the track as the machine moves in a forwardly direction). The other lug of the shoe is on the other side of the vertical plane and substantially on the other half of the shoe. Thus, when viewed from inside the loop formed by the endless track, each shoe has two lugs positioned in diagonally opposite corners of the shoe.

Normally, the lugs of a particular shoe are engaged simultaneously by a pair of diagonally positioned teeth on the sprocket. The spacing between the pairs of teeth on the sprocket is slightly greater than the spacing between the pairs of lugs on successive shoes so that only one pair of lugs (on a particular shoe) are engaged by a pair of teeth on the sprocket at any given time. As the sprocket rotates, successive pairs of teeth engage the lugs of successive shoes, but at any given time only the one pair of lugs (of a single shoe) is engaged by a single pair of teeth on the sprocket. If the direction of rotation of the sprocket is reversed, to drive the machine in the opposite direction, the opposite faces of the teeth engage the opposite faces of the lugs. It should be noted that both faces of the teeth are inclined, as are both faces of the lugs, to facilitate a smooth meshing engagement between the sprocket teeth and the shoe lugs.

The difficulty of casting the shoes and/or sprockets with sufficient precision to assure complete engagement of the sprocket teeth with both lugs of a shoe creates misalignment which accelerates wear of the parts. For example, if one lug or tooth of a pair is not positioned precisely, the one or the other lug and tooth of the pair alone will be in driving engagement. If the single driving engagement between tooth and lug occurs at a face surface spaced a significant distance from the shoe pivotal axis under tension, the shoe engaged with the sprocket will tend to swing outwardly, because of the large moment to which the shoe is subjected. If the drive shoe is urged outwardly, the next shoe may not engage properly with the next pair of sprocket teeth, causing wear or even fracture of the shoe or sprocket.

SUMMARY OF THE INVENTION

In overcoming the problem of the typical crawler drive system, I have recognized and accepted the difficulty of casting the sprockets and/or shoes with precision. Instead of attempting to improve that precision, I have instead deliberately positioned the lugs with respect to the sprocket teeth so that only one lug of one shoe is engaged by a sprocket tooth at any given instant.

The pivot pin at the rear end of the shoe engaged with the sprocket driving tooth transmits the tension from the driven shoe to the following shoes which are being pulled forwardly by the driven shoe. The forward pin of the driven shoe is slack, so that any pivoting motion of the shoe will occur about the rear pin which is held in its path by the tension transmitted therethrough.

I have therefore selected for engagement the lug on the rear half of the shoe (relative to the direction of travel of the driven shoe, which is in the upper run when the machine is traveling in a forward direction), and have selected the rear face of that lug for engagement. Consequently, when the rear face of the rear lug of the driven shoe is engaged by the sprocket tooth immediately to the rear thereof, the moment arm of the force produced by the sprocket tooth on the lug is small around the rear pivot axis. There is no driving engagement by a sprocket tooth with the forward lug of the shoe, so that there is no substantial moment arm tending to swing the shoe outwardly. As a result, the driven shoe will tend to remain in its path around and between the sprockets to facilitate meshing with the sprocket and to minimize wear caused by lifting of the driven shoe from the sprocket teeth.

It is therefore one object of the present invention to provide a crawler drive for a machine with improved meshing engagement between track sprockets and track shoes to avoid excessive wear and damage to the shoes. It is another object of the present invention to provide a track shoe and track sprocket in a crawler drive system wherein a single shoe lug is engaged by a single sprocket tooth at any given instant. It is yet another object of the present invention to minimize any tendency of a crawler track shoe to swing outwardly from its intended path.

BRIEF DESCRIPTION OF THE DRAWINGS

FIG. 1 is a view in side elevation of the crawler track of a machine, such as a crane.

FIG. 2 is a plan view of one track of the crane.

FIG. 3 is a view taken on the line 3—3 of FIG. 1.

FIG. 4 is a view of one sprocket of the crawler drive system showing the engagement of a sprocket tooth with a shoe lug when the sprocket is rotating in one direction to drive the crane forwardly.

FIG. 5 is a view taken as the view of FIG. 4 but showing the engagement of a sprocket tooth with a shoe lug when the sprocket is rotating in the opposite direction from that shown in FIG. 4.

FIG. 6 is a projected view of the sprocket teeth and shoe lugs, taken on the line 6—6 of FIG. 4, when the sprocket is turning in the same direction as in FIG. 4.

FIG. 7 is a projected view of the sprocket teeth and shoe lugs taken on the line 7—7 of FIG. 5 when the sprocket is turning in the same direction as in FIG. 5.

FIG. 8 is a view similar to the view of FIG. 6 except showing a prior art construction when the crane is moving in a forwardly direction.

FIG. 9 is a view similar to the view of FIG. 7 where the crane is moving in a rearwardly direction except showing the prior art construction of FIG. 8.

FIG. 10 is a schematic view showing the moment on a shoe urging it outwardly from its path.

FIG. 11 is a view similar to the view of FIG. 10 showing the moment on a prior art shoe.

DESCRIPTION OF THE PREFERRED EMBODIMENT

There is shown in FIG. 1 one side of part of a crane 10, although it will be understood that the present invention can be incorporated in other type machines and vehicles, employing endless tracks, such as tanks, earth-movers and the like. The crane 10 has a base, or lower works, 12 with laterally extending axles 14, and an upper works 15 mounted on base 12. On each side of the base 12 there is mounted on axles 14 a main frame 16.

Each main frame 16 has, at each end, a pair of spaced, parallel walls 18 (see FIG. 3), each with an edge opening 19 therein. Bearings 20 are slidably received in said openings to support axles 22, 23 extending between the spaced end walls 18 of each main frame 16. A sprocket 24 is received on each of the axles 22, 23 in splined relation as shown in FIG. 3. The bearings 20 can be adjusted longitudinally in each of the main frames by means of threaded shafts 26 connected to the bearings and received in nuts 28 secured to the frame. Upper guide rollers 29 and lower guide rollers 30 are journaled in the frames as shown in FIG. 1.

The two axles 22, one on each side of the machine, (which are the rear axles when the crane is traveling in a normal forward direction indicated by arrow A in FIG. 1) are connected through transmissions (not shown) to a power source (not shown) to drive the rear sprockets on each side of the crane in a clockwise direction as viewed in FIGS. 1 and 4 (indicated by arrow B), when the transmission is set for forward movement of the crane. When the transmission is shifted to drive the crane rearwardly (indicated by arrow C), the axle 22 rotates in a reverse direction to rotate the rear sprockets counterclockwise as viewed in FIG. 5 (indicated by arrow D).

As shown best in FIGS. 3, 4 and 5, the sprockets have a hub 30 received on the axles, spokes 32 extending radially from the hub, and a circular rim 33 supported by the spokes. The rims have double rows of teeth, T, as will be more fully described hereafter. The two sprockets 24 on each side of the crane, which lie in longitudinal, vertical planes E (FIG. 3), receive an endless crawler track, or tread 34. The track is guided in an endless path P in plane E by the sprockets 24 and the guide rollers 29, 30.

The track is made up of shoes 36, each of which has forwardly and rearwardly extending spaced ears 37 with openings thereon. The spaced ears at each end are received between the ears of adjacent shoes with the ear openings of the shoes aligned to receive therein pivot pins 38 which lie in lateral pivot axes, referred to collectively as F. Each of the shoes has an inwardly extending pair of lugs (identified collectively as L), defining with the lugs of the other shoes, a double row of lugs for successive engagement with the double rows of teeth (identified collectively as T), of the sprocket.

Structure similar to that described above is shown, and described in more detail, in the U.S. patent to Ekbom, U.S. Pat. No. 2,167,039. The structure of the present invention differs from the structure shown in the patent to Ekbom primarily in the arrangement of the sprocket teeth T and the shoe lugs L.

For purposes of explanation, the shoes of the present invention in the rear drive sprocket are indicated successively (see FIGS. 4, 5) as S1 to S6, beginning at the top. The pivotal axes F between the shoes are indicated more specifically by the reference numeral F12 (see FIGS. 6, 7) indicating the pivot axis between shoes S1, S2, the reference numeral F23 indicating the pivot axis between shoes S2, S3, and so on. The lugs of the shoes are indicated (see FIGS. 6, 7) as L1A, L1B for shoe S1; L2A, L2B for shoe S2; and so on as shown in FIGS. 6 and 7. The teeth of the sprocket of the present invention are identified in pairs, with each pair, such as T12A and T12B, defined as the two teeth received between the lugs of adjacent shoes as the track meshes with the sprocket. Succeeding teeth are numbered in a corresponding manner. It should be noted that the teeth and lugs on one side of center plane E are aligned in a row (which can be identified as row RA) and the teeth and lugs on the other side of plane E are aligned in a row (which can be identified as row RB).

The novel arrangement of the present invention can, perhaps, be better understood and appreciated if a typical prior art arrangement (as, for example, Ekbom U.S. Pat. No. 2,167,039), as shown in FIGS. 8, 9 and 11 of the present disclosure, is first discussed. The reference numerals used to identify the prior art structure shown will correspond to the numerals used in the present disclosure, except that each will be primed.

FIG. 8 shows a projection of the rear half of the sprocket (identified as 24') of a prior art crane moving as the crane of FIG. 1 (to the right in a forwardly direction). The position of the lugs (identified collectively a L') of the shoes engaged with the sprocket 24' are also shown, with the upper teeth T12A', T12B' of the sprocket and the lugs L1A', L1B' of the upper shoe shown to the right and the lower sprocket teeth T56A', T56B' and lugs L6A, L6B of the lower shoe shown to the left. The sprocket 24' depicted is the rear sprocket (corresponding to the left hand sprocket of FIG. 1) which is the power-driven drive sprocket.

The track shoes of FIG. 8 (which are pivotally connected together on lateral axes F') lie symmetrically on the center plane E' of the sprockets and each has two lugs spaced from each other in a longitudinal and lateral direction so that each shoe has one lug on one side of the center plane E' and one lug on the opposite side of plane E'.

An examination of FIG. 8 will show that in the prior art device depicted, the spacing FLT between the rear face of the lugs L1A' and L1B' of the upper shoe, and the spacing between the forward face of the teeth T12A' and T12B' are equal so that, on rotation of the sprocket to drive the machine forward, the teeth T12A' and T12B' simultaneously engage the lugs L1A' and L1B'. The spacing between the two teeth of any one pair and the teeth of the adjacent pair are equal to the spacing between all other pairs of teeth on the sprocket. Also, the spacing between lugs of adjacent pairs are substantially equal. The spacing M' between corresponding surfaces of any two adjacent pairs of teeth (such as the forward drive faces of the teeth in one of the rows RA' or RB') is slightly greater than the spacing N' between corresponding surfaces of two adjacent pairs of lugs (such as the rear driven faces of the lugs in one of the rows RA' or RB'). Consequently, only one pair of teeth of the sprocket (the teeth T12A' and T12B') are engaged with the lugs (L1A' and L1B') of one shoe (the upper, if the machine is traveling forwardly to the right) of the track. This means that there is a large tension force between the rear end of the upper shoe and the forward end of the next rearward shoe, but very little tension between the forward end of the upper shoe and the rear end of the next forward shoe. As a result, the pivot pin 38' on pivot axis F12' between the upper shoe and the next rearward shoe is held firmly in the path P' of the track, while the pivot pin between the upper shoe and the next forward shoe is slack and can move laterally with respect to the path, as indicated by arrow V in FIG. 11.

FIG. 9 shows, in prior art structure, the condition existing when the sprocket is reversed to move the machine or vehicle rearwardly. When this occurs, the rear faces of the sprocket teeth move toward the forward faces of the shoe lugs, and the shoe (corresponding to shoe S6 in FIG. 5) which is at the bottom of the sprocket, becomes the driven shoe. The lugs L6A' and L6B' of the driven shoe are simultaneously engaged by the teeth T56A' and T56B'.

In the FIGS. 6, 7, 8 and 9, the teeth and shoes at the top of the sprocket have been identified with particular numbers and the teeth and shoes at the bottom of the sprocket have been identified with other numbers. It will be understood that during travel of the machine, the teeth are continuously moving while the shoes, and lugs thereon, move whenever the shoe is off the ground. FIGS. 6, 7, 8 and 9, therefore, depict the position of teeth and lugs at a given instant only. However, it should be understood that as parts move and are replaced by succeeding parts, the function and position of the succeeding parts remains the same as the previous function and position of the preceding parts. In other words, in forward movement of the machine, the upper shoe is always the only driven shoe and, in rearward movement of the machine, the lower shoe is always the only driven shoe.

As shown in FIG. 11, the forces acting on the prior art shoe by the simultaneous engagement of the two teeth T12A' and T12B' in rows RA' and RB' create two vertical force components VFT12A' and VFT12B', both of which tend to turn the shoe counterclockwise about pivot axis F12' (as shown by arrow V) out of its normal path P'. Because of the greater length of the moment arm MAA' associated with the vertical force component VFT12A' caused by engagement with sprocket tooth T12A' than the shorter moment MAB', the former force component is much more instrumental than the latter in turning the shoe out of the path of travel P'. The outward movement of the shoe cannot only increase wear, but can also cause the teeth of the sprockets to clash with lugs on the shoes. In extreme cases, sprocket or shoes and/or lugs thereof can fracture.

I have recognized the fact that, due to lack of precision in casting shoes and/or sprockets, one of three possible situations will exist in the prior art construction: either the force of the sprocket (1) will be substantially split between lugs L1A' and L1B', (2) will be substantially borne by lug L1A', or will be substantially borne by lug L1B'. In order to eliminate the possibility of either of the first two alternatives, and to assure that only the optimum condition of power transmission between the sprocket and the driven shoe will occur in either direction of vehicle movement, I have rearranged the relative position between the shoe lugs and the sprocket teeth so that, regardless of the inaccuracy of the castings, only one lug of a single shoe will be engaged by a single tooth and the engagement will occur on the lug surface closest to the tension pivot pin (that is, the upstream, or trailing, pivot pin) of the driven shoe.

In the sprocket teeth, shoe lug arrangement of the present invention, only a single row RB of teeth and lugs engage when the machine is moving in a forward direction (FIG. 6), and only a single, but different, row RA of teeth and lugs engage when the machine is moving in a reverse direction (FIG. 7).

As shown in FIG. 6, the distance G between the rear, or trailing, surfaces of the lugs L1A and L1B is greater than the distance H between the forward, or leading, surfaces of the teeth T12A and T12B. Thus, when the sprocket tooth T12B engages the driven shoe lug L1B, the tooth T12A is spaced from the lug L1A. It will be noted that the distance M between corresponding surfaces of adjacent teeth (such as the forward faces of teeth T34A and T45A) is greater than the distance N between corresponding surfaces on adjacent lugs (such as the rear face of lugs L3A and L4A), as in the prior art, so that only one of the shoes of the track will be in driven contact with the sprocket.

In forward movement of the machine, successive sprocket teeth of row RB only (which are trailing teeth of the pairs when the sprocket moves in the direction indicated) engage the single lug in that row of successive shoes (which lug is the trailing lug of the shoe when the shoe travels in the direction indicated) so that, at any given instant, the single lug in row RB on the upper shoe is driven by a single sprocket tooth in row RB.

As shown in FIG. 7, when the direction of sprocket rotation is reversed to drive the machine or vehicle in a reverse direction, only the lugs in row RA are engaged by a tooth of the sprocket, which is also in row RA. There is no driving engagement between the lugs or teeth of row RB. It will be seen from FIG. 7 that at any given instant, the lower shoe on the sprocket only, and only the lug L6A thereon, is in driven engagement with a tooth of the sprocket, the single tooth T56A. It will also be noted that in the direction of sprocket and shoe travel of FIG. 7, the teeth and lugs of row RA are the trailing ones of the pairs.

With this unique and novel arrangement of tooth and lug, where only one lug of one shoe is driven at any given instant, and where one row of lugs are driven for forward movement only and the other row of lugs are driven for reverse movement only, many of the problems of the prior art are avoided. I am able, with my arrangement, to utilize as driven faces on the lugs, only those faces closest to the pivot pin which is held under tension, regardless of the direction of movement of the vehicle. The advantage of this is illustrated in FIG. 10. Since all the force imparted to the shoe from the drive tooth produces a force (which may be resolved into a vertical and horizontal component) in which the vertical component VFT12B acts in a vertical plane close to the securely held tension pivot pin (a distance MAB), there is a greatly reduced tendency for the shoe to lift out of the path P despite the slack at the opposite end of the shoe. This advantage prevails in either direction of travel of the track.

Although the best mode contemplated for carrying out the present invention has been herein shown and described, it will be apparent that modification and variation may be made without departing from what is regarded to be the subject matter of the invention.

What is claimed is:

1. A crawler drive system for a machine having an endless longitudinally extending crawler track of shoes pivotally connected on lateral axes and having a pair of spaced sprockets lying in a common longitudinal plane to receive said track, each shoe having a pair of lugs, the lugs of each pair being on opposite sides of said common plane and having rear faces spaced apart in the longitudinal direction, the sprockets having a plurality of pairs of teeth, the teeth of each pair being on opposite sides of said common plane and positioned between the lugs of two adjacent shoes, the lugs and teeth on one side of said common plane defining one row of alternate teeth and lugs, and the teeth and lugs on the opposite side of said common plane defining another row of alternate teeth and lugs, the improvement wherein the longitudinal distance between the rear faces of the two lugs on one of said shoes is greater than the distance between the forward faces of the two sprocket teeth immediately behind said lugs so that only the rear lug of the shoe will be engaged by a sprocket tooth in driving engagement at a time.

2. A crawler drive system for a machine having an endless longitudinally extending crawler track of shoes pivotally connected on lateral axes and having a pair of spaced sprockets lying in a common longitudinal plane to receive said track, each shoe having a pair of lugs, the lugs of each pair being on opposite sides of said common plane and having rear faces spaced apart in the longitudinal direction, the sprockets having a plurality of pairs of teeth, the teeth of each pair being on opposite sides of said common plane and positioned between the lugs of two adjacent shoes, the lugs and teeth on one side of said common plane defining one row of alternate teeth and lugs, and the teeth and lugs on the opposite side of said common plane defining another row of alternate teeth and lugs, the spacing between the teeth in each row being greater than the spacing between the lugs of that row so that, in each row, a single tooth is in driving engagement with a single lug at any given time, the improvement wherein the longitudinal distance between the rear face of a shoe lug in one row and the rear face of the other lug of that shoe in the other row is greater than the distance between the front faces of the two teeth behind said lugs whereby the rear lug only of the lugs of one shoe is engaged by a sprocket tooth at any given instant.

3. A crawler drive system for a machine having an endless longitudinally extending crawler track of shoes pivotally connected on lateral axes and having a pair of spaced sprockets lying in a common longitudinal plane to receive said track, each shoe having a pair of lugs, the lugs of each pair being on opposite sides of said common plane and the sprockets having a plurality of pairs of teeth, the teeth of each pair being on opposite sides of said common plane and positioned between the lugs of two adjacent shoes, the lugs and teeth on one side of said common plane defining one row of alternate teeth and lugs, and the teeth and lugs on opposite side of said common plane defining another row of alternate teeth and lugs, the spacing between the teeth in each row being greater than the spacing between the lugs of that row so that in each row, a single tooth is in driving engagement with a single lug at any given time, the improvement wherein one of said rows of alternate lugs and teeth is provided for movement of the machine in a forward direction and the other of said rows of alternate lugs and teeth is provided for movement of the machine in a reverse direction, the relative positioning of said lugs and teeth in said other row being different from the relative positioning in said one row so that one tooth in said one row engages one lug of that row at any given time to propel the machine forwardly and one tooth in said other row engages one lug of that row at any given time to propel the machine rearwardly, the distance between the trailing surfaces of the lugs of each shoe being greater than the distance between the leading surfaces of the teeth behind said lugs of the shoe in either direction of travel.

4. A crawler drive system for a machine having an endless longitudinally extending crawler track of shoes pivotally connected on lateral axes and having a pair of spaced sprockets lying in a common longitudinal plane to receive said track, each shoe having a pair of lugs, the lugs of each pair being on opposite sides of said common plane and the sprockets having a plurality of pairs of teeth positioned between the lugs of adjacent shoes, the teeth of each pair being on opposite sides of said common plane to engage the lugs of one of said shoes, the lugs and teeth on one side of said common plane defining one row of alternate teeth and lugs, and the teeth and lugs on the opposite side of said common plane defining another row of alternate teeth and lugs, the lugs in one of said rows being staggered in the longitudinal direction with respect to the lugs in the other row and the teeth in said one of said rows being staggered in the longitudinal direction with respect to the teeth in said other row, the spacing between the teeth in each row being greater than the spacing between the lugs of that row so that in each row a single tooth is in driving engagement with a single lug at any given time, the improvement wherein the lugs of said one row is staggered with respect to the lugs of said other row a different amount than the teeth of said one row is staggered with respect to the teeth of said other row so that a tooth of one row only will engage a lug of that row at any given time, the distance between the trailing surfaces of the lugs of each shoe being greater than the distance between the leading surfaces of the teeth behind said lugs of the shoe in either direction of travel.

5. A crawler drive system for a machine having an endless longitudinally extending crawler track of shoes pivotally connected on lateral axes and having a pair of spaced sprockets lying in a common longitudinal plane to receive said track, at least one of said sprockets reversely rotatable to move the machine in a forward direction or a rearward direction, each shoe having a pair of lugs, the lugs of each pair being on opposite sides of said common plane and the sprockets having a plurality of pairs of teeth, the teeth of each pair being on opposite sides of said common plane and between the lugs of two adjacent shoes, the lugs and teeth on one side of said common plane defining one row of alternate teeth and lugs, and the teeth and lugs on the opposite side of said common plane defining another row of alternate teeth and lugs, the spacing between the teeth in each row being greater than the spacing between the lugs of that row so that in each row, a single tooth is in driving engagement with a single lug at any given time, the improvement wherein one of said rows of alternate lugs and teeth are provided for movement of the machine in a forward direction and the other of said rows of alternate lugs and teeth are provided for movement of the machine in a reverse direction, the forward face of the rear tooth only of a pair of teeth being engaged with the rear face of the rear lug only of a track shoe to exert tension between said shoe and the next rearward shoe when said one sprocket is rotated in one direction to move the machine forwardly, and the rear face of the forward tooth only of a pair of teeth being engaged with the forward face of the forward lug only of a track shoe to exert tension between said shoe and the next forward shoe when the sprocket is rotated in the opposite direction to move the machine rearwardly.

6. A crawler drive system for a machine having an endless longitudinally extending crawler track mounted on a pair of spaced sprockets lying in a common longitudinal plane, said track comprising a plurality of shoes, each shoe pivotally connected to the adjacent shoes in spaced lateral axes, each shoe having a pair of lugs straddling said common plane said lugs each having a trailing surface and the trailing surfaces of the lugs of each pair spaced apart in the longitudinal direction, each sprocket having a plurality of pairs of teeth, the teeth of each pair straddling said common plane and positioned between the lugs of two adjacent shoes, said track driven in one direction or the other by one of said sprockets, the pairs of teeth of said one sprocket spaced in the longitudinal direction a greater distance than the pairs of lugs of the track shoes to establish driving engagement with one shoe only at a time, driving tension in the track transmitted from the driven shoe through the connection at the trailing edge of the driven shoe to succeeding shoes in either direction of track movement, the improvement wherein the longitudinal distance between the trailing surfaces of the lugs of each shoe is greater than the longitudinal distance between the leading surfaces of the teeth behind the lugs of said shoe in either direction of track movement on said one of said sprockets to establish driving engagement between the sprocket and the driven shoe through one lug only of said shoe when the track is driven in one direction and to establish driving engagement between the sprocket and the driven shoe through the other lug only of said shoe when the track is driven in the opposite direction, said driving engagement in either direction of track travel occurring on the trailing face of the lug closest the connecting axis at the trailing edge of the shoe to minimize the moment generated around said axis.

7. A crawler drive system for a machine having an endless longitudinally extending crawler track mounted on a pair of spaced sprockets lying in a common longitudinal plane for travel of said track in an endless path, said track comprising a plurality of shoes pivotally connected together at spaced lateral axes, each shoe having a pair of lugs with one on one side of said common plane and the other on the other side of said plane and each sprocket having a plurality of pairs of teeth, each pair positioned between the lugs of adjacent shoes and each pair having one tooth on one side of said common plane and the other tooth on the other side of said plane, said track driven in one direction or the other by one of said sprockets, the pairs of teeth of said one sprocket spaced in the longitudinal direction a greater distance than the lugs of the track shoes to establish driving engagement with one shoe at a time to define at any instant an instantaneous driven shoe and to establish driving engagement sequentially one at a time with succeeding shoes, the driving tension in the track transmitted from the driven shoe through the connection at the trailing edge of the driven shoe to the succeeding shoes in either direction of track travel, the improvement wherein the distance in the longitudinal direction between the lugs on each shoe is greater than the distance in the longitudinal direction between the teeth of each pair of teeth on the sprocket to establish driving engagement at any instant between the trailing face of the trailing lug only of a shoe and the leading face of the tooth behind said trailing lug, to minimize the moment arm about the axis at the trailing edge of the driven shoe of the force component tending to lift the shoe out of its path of travel.

8. A crawler drive system for a machine having an endless longitudinally extending crawler track mounted on a pair of spaced sprockets lying in a common longitudinal plane for travel of said track in an endless path, said track comprising a plurality of shoes pivotally connected together at spaced lateral axes, each shoe having a pair of lugs longitudinally and laterally spaced with one lug on one side of said common plane and the other lug on the other side of said plane, one of said lugs leading the other of said lugs in one direction of shoe travel and the other of said lugs leading said one lug in the opposite direction of shoe travel, each sprocket having a plurality of pair of teeth, each pair of teeth positioned between the lugs of adjacent shoes and the teeth of each pair longitudinally and laterally spaced with one tooth on one side of said plane and the other tooth on the other side of said plane, said one tooth leading the other tooth in one direction of tooth travel and said other tooth leading said one tooth in the opposite direction of tooth travel, said track driven in one direction or the other by one of said sprockets, the distance between the leading surfaces of corresponding teeth of adjacent pairs of teeth of said one sprocket being greater than the distance between the trailing edges of corresponding lugs of adjacent track shoes to establish driving engagement with one shoe only at a time to define at any instant an instantaneous driven shoe and to establish driving engagement sequentially one at a time with succeeding shoes, the driving tension in the track transmitted in either direction of track travel from the driven shoe through the connection at the trailing edge of the driven shoe to the succeeding shoes, the improvement wherein the distance in the longitudinal direction between the trailing surfaces on the lugs of each shoe is greater than the distance in the longitudinal direction between the leading surfaces on the teeth of the pair of teeth on the sprocket behind said lugs to establish driving engagement at any instant, in either direction of track travel, between the trailing lug only of the driven shoe and the tooth behind said lug, for a minimum moment about the axis at the trailing pivotal connection of the shoe to succeeding shoes to minimize swinging movement of the driven shoe about that axis out of the path of the track.

* * * * *